United States Patent
Butler et al.

(10) Patent No.: US 6,466,398 B1
(45) Date of Patent: Oct. 15, 2002

(54) DISK DRIVE COMPRISING A COVER HAVING SLOTS NEAR A SHAFT APERTURE FOR REDUCING RESONANCE

(75) Inventors: Walter W. Butler, Scotts Valley, CA (US); Gregory G. Foisy, Tracy, CA (US); John R. Gustafson, Los Gatos, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 159 days.

(21) Appl. No.: 09/676,634

(22) Filed: Sep. 30, 2000

(51) Int. Cl.[7] ............................................... G11B 33/08
(52) U.S. Cl. ................................................... 360/97.02
(58) Field of Search ........................ 360/97.01–98.01, 360/98.07, 99.08

(56) References Cited

U.S. PATENT DOCUMENTS

| | | | |
|---|---|---|---|
| 5,282,100 A | | 1/1994 | Tacklind et al. ......... 360/97.02 |
| 5,781,373 A | | 7/1998 | Larson et al. ............ 360/97.02 |
| 5,790,344 A | * | 8/1998 | Allen ...................... 360/97.02 |
| 5,875,067 A | * | 2/1999 | Morris et al. ............ 360/97.01 |
| 6,177,173 B1 | * | 1/2001 | Nelson ...................... 428/137 |
| 6,249,400 B1 | * | 6/2001 | Hong et al. .............. 360/97.02 |
| 6,266,207 B1 | * | 7/2001 | Iwahara et al. .......... 360/97.02 |
| 6,275,352 B1 | * | 8/2001 | Tadepalli et al. ........ 360/97.02 |
| 6,308,961 B1 | * | 10/2001 | Kunikane et al. ........... 277/637 |

FOREIGN PATENT DOCUMENTS

| | | | |
|---|---|---|---|
| JP | 9-73741 | * | 3/1997 |
| JP | 11-328945 | * | 11/1999 |

* cited by examiner

*Primary Examiner*—Jefferson Evans
(74) *Attorney, Agent, or Firm*—W. Chris Kim, Esq.; Milad G. Shara, Esq.

(57) ABSTRACT

A disk drive is disclosed with reduced resonance. The disk drive comprises a disk, a fixed spindle shaft disposed axially through the disk, a spindle motor for rotating the disk about the fixed spindle shaft, wherein a resonance is associated with the spindle motor rotating the disk. The disk drive further comprises a head, an actuator arm for actuating the head radially over the disk, a base, and a cover attached to the base to form a head disk assembly chamber. The cover comprises a shaft aperture positioned over the fixed spindle shaft, the shaft aperture for receiving a fastener for attaching the cover to the fixed spindle shaft. The cover further comprises a plurality of slots proximate the shaft aperture, wherein the shaft aperture and slots provide a flexible support for the fixed spindle shaft which reduces the resonance associated with the spindle motor.

10 Claims, 7 Drawing Sheets

DISK DRIVE COMPRISING A COVER HAVING SLOTS NEAR A SHAFT APERTURE FOR REDUCING RESONANCE

BACKGROUND OF THE INVENTION

1. Field of the Invention

The present invention relates to disk drives for computer systems. More particularly, the present invention relates to a disk drive comprising a cover having slots near a shaft aperture for reducing resonance.

2. Description of the Prior Art

A computer system usually includes one or more disk drives for economical, non-volatile data storage. FIG. 1 shows a prior art disk drive 100 disclosed, for example, in U.S. Pat. No. 5,282,100 to Tacklind et al. which includes a housing formed by fitting a cover comprising an inner layer 102 and an outer layer 104 to a base 106 to create a sealed head disk assembly (HDA) chamber. The HDA includes one or more disks 108 stacked in a spaced-apart relationship on a spindle motor hub and rotated by a spindle motor (not shown). The disks 108 rotate in close proximity to a head 114 that is disposed by means of a head gimbal assembly (HGA) attached to one of a plurality of actuator arms 110.

The spindle motor includes a stationary element such as a fixed spindle shaft 116 affixed to the disk drive housing at the base and cover to define and stabilize a spindle axis about which a hub rotates the disks 108. A stator of the spindle motor, as well as bearings and seals, are secured between the fixed spindle shaft 116 and the rotating hub. To create this stabilized spindle axis, inner layer 102 includes shaft aperture 118 for receiving a fastener, such as a screw 120, for rigidly attaching the inner layer 102 to the fixed spindle shaft 116.

The actuator arms 110 are part of a head stack assembly (HSA) which is rotated about a pivot bearing assembly by a voice coil motor (VCM) 112. The pivot bearing assembly includes a stationary element such as a pivot shaft 122 that is fixed to the disk drive housing at the base 106 and inner layer 102 of the cover to define and stabilize a pivot axis for the HSA. Typically, the pivot shaft 122 is rigidly coupled to the cover (e.g., by screw 124) and to the base 106. The rigid attachment of the spindle and pivot shafts fixes and stabilizes the relationship of the spindle axis and the pivot axis to control head positioning error. As the spindle motor rotates, the bearings and the fixed spindle shaft 116 tend to vibrate at a first set of characteristic frequencies associated with the bearings. The spindle motor and disk pack also tend to vibrate creating a resonance at a second set of frequencies associated with forward and reverse pitch modes of the spindle motor. If the first set frequencies line up with the second set of frequencies (vibration modes), the resulting resonance can perturb the actuator arms 110 impairing the ability of the disk drive 100 to maintain the heads 114 over the centerline of data tracks during read and write operations. If the heads 114 move off track, the fidelity of data written to and read from the disks 108 degrades and may result in failures. Thus, it is desirable to prevent vibration frequencies characteristic of the bearings and fixed spindle shaft 116 from lining up with vibration modes characteristic of the spindle motor and disk pack.

FIG. 2 shows a cover of a prior art HDA intended to reduce the resonances by shifting vibration frequencies characteristic of the fixed spindle shaft 116 away from the vibration frequencies characteristic of the spindle motor bearings. A washer 126 is attached to the inner layer 102 of the cover using a visco damping adhesive (the cover of FIG. 2 is inverted). The washer 120 is aligned concentric with the shaft aperture 118 and abuts the fixed spindle shaft 116 creating a damping effect. The damping effect of the washer 126 shifts the vibration mode frequencies characteristic of the motor and disk pack away from the vibration frequencies characteristic of the spindle motor bearings. However, incorporating the washer 126 requires an additional component in the disk drive 100, and requires an additional manufacturing step. Further, the visco damping adhesive for attaching the washer 126 to the inner layer 102 of the cover may creep and become less secure with time and temperature.

There is, therefore, a need to reduce resonances in a disk drive in a secure, cost-effective manner.

SUMMARY OF THE INVENTION

The present invention may be regarded as a disk drive with reduced resonance, comprising a disk, a fixed spindle shaft disposed axially through the disk, a spindle motor for rotating the disk about the fixed spindle shaft, wherein a resonance is associated with the spindle motor rotating the disk. The disk drive further comprises a head, an actuator arm for actuating the head radially over the disk, a base, and a cover attached to the base to form a head disk assembly chamber. The cover comprises a shaft aperture positioned over the fixed spindle shaft, the shaft aperture for receiving a fastener for attaching the cover to the fixed spindle shaft. The cover further comprises a plurality of slots proximate the shaft aperture, wherein the shaft aperture and slots provide a flexible support for the fixed spindle shaft which reduces the resonance associated with the spindle motor.

In one embodiment, the slots comprise a plurality of slot apertures. In another embodiment, the slots comprise a plurality of grooves. In yet another embodiment, the cover comprises an inner and outer layer, and the inner layer comprises the slots. In yet another embodiment, the slots comprise at least one spoke extending substantially radially from the shaft aperture. In yet another embodiment, the slots comprise at least one arc substantially concentric with the shaft aperture. In yet another embodiment, the slots comprise at least one spoke extending substantially radially from the shaft aperture, and at least one arc substantially concentric with the shaft aperture.

The present invention may also be regarded as a method for manufacturing a disk drive with reduced resonance. A shaft aperture is formed in a cover, and plurality of slots are formed in the cover proximate the shaft aperture. A head disk assembly is disposed into a base of a head disk assembly chamber. The head disk assembly comprises a disk, a fixed spindle shaft, and a motor for rotating the disk about the fixed spindle shaft. The cover is attached to the base of the head disk assembly chamber by attaching a fastener to the fixed spindle shaft through the shaft aperture. The slots provide a flexibility in the cover which reduces a resonance associated with the spindle motor rotating the disk.

DESCRIPTION OF THE PREFERRED EMBODIMENTS

Figure 3:
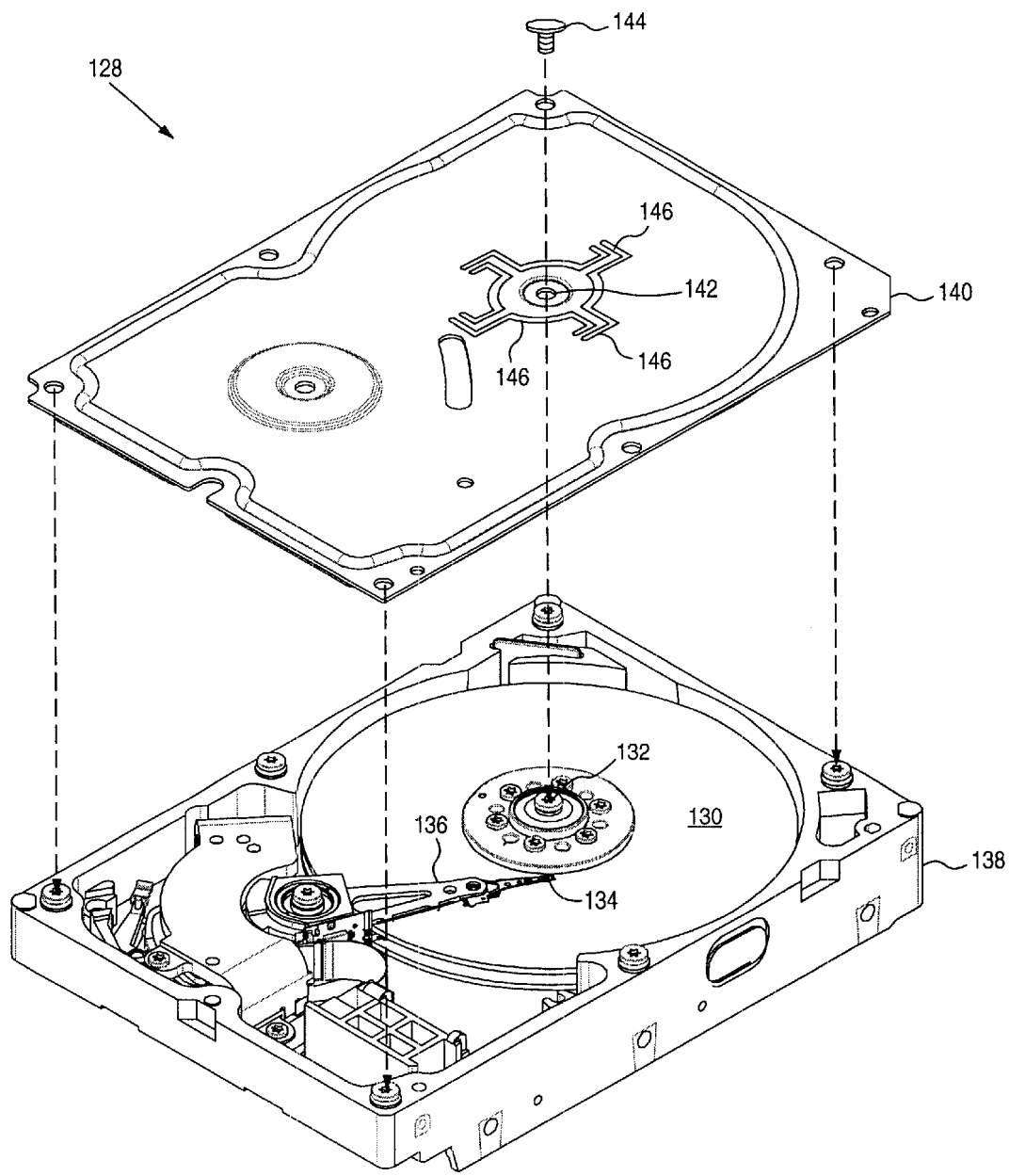
FIG. 3 shows a disk drive according to an embodiment of the present comprising a cover with a shaft aperture and a plurality of slots proximate the shaft aperture to provide a flexible support for the fixed spindle shaft, thereby reducing resonance in the disk drive.

FIG. 3 shows a disk drive 128 with reduced resonance according to an embodiment of the present invention. The disk drive 128 comprises a disk 130, a fixed spindle shaft 132 disposed axially through the disk 130, and a spindle motor for rotating the disk 130 about the fixed spindle shaft 132, wherein a resonance is associated with the spindle motor rotating the disk 130. The disk drive 128 further comprises a head 134, an actuator arm 136 for actuating the head 134 radially over the disk 130, a base 138, and a cover 140 attached to the base 138 to form a head disk assembly chamber. The cover 140 comprises a shaft aperture 142 positioned over the fixed spindle shaft 132, the shaft aperture 142 for receiving a fastener 144 for attaching the cover 140 to the fixed spindle shaft 132. The cover 140 further comprises a plurality of slots 146 proximate the shaft aperture 142, wherein the shaft aperture 142 and slots 146 provide a flexible support for the fixed spindle shaft 132 which reduces the resonance associated with the spindle motor.

Figure 1:
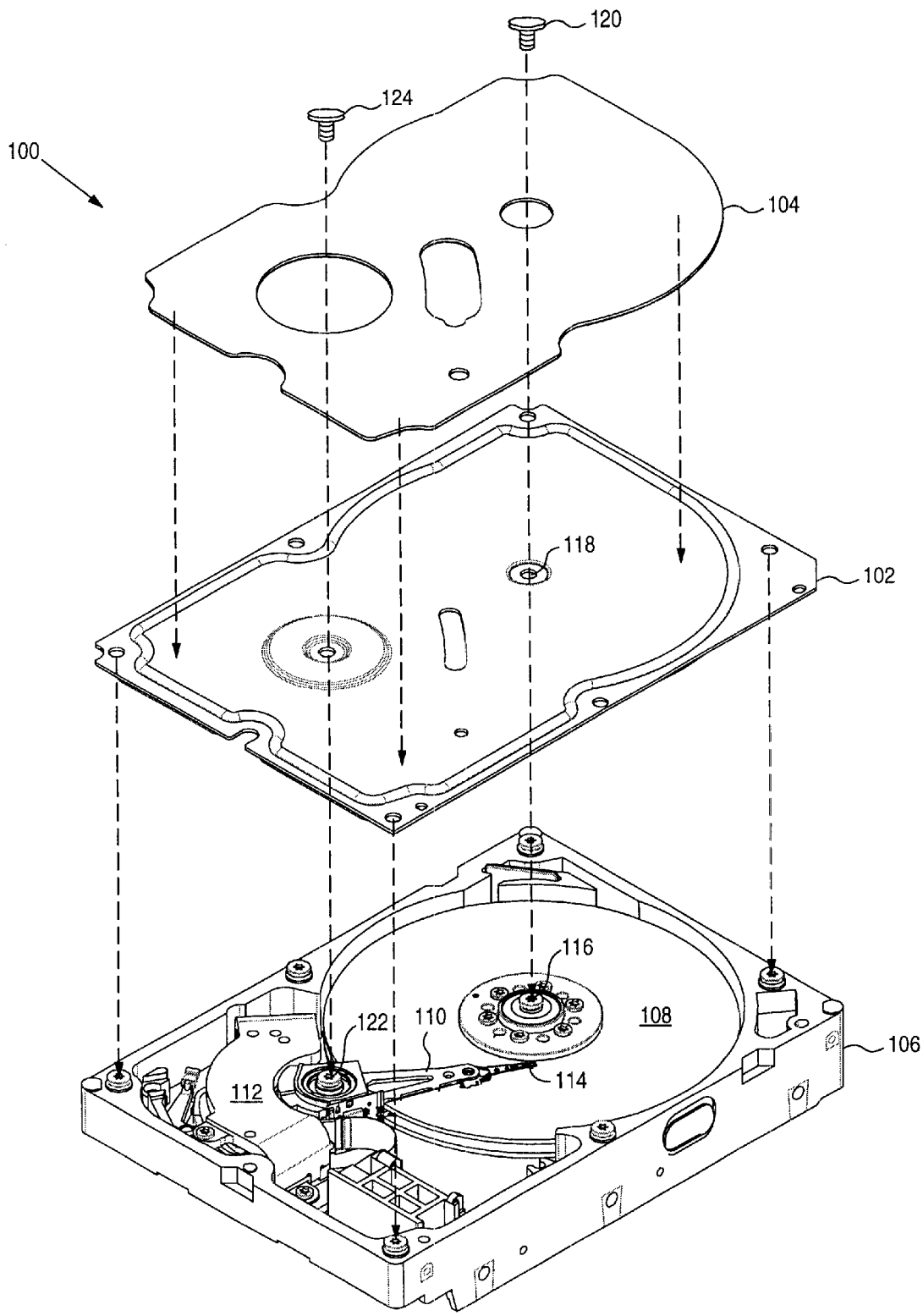
FIG. 1 shows a prior art disk drive comprising a fixed spindle shaft disposed axially through a disk, a spindle motor for rotating the disk, a base, and a cover attached to the base to form a head disk assembly chamber.
Figure 2:
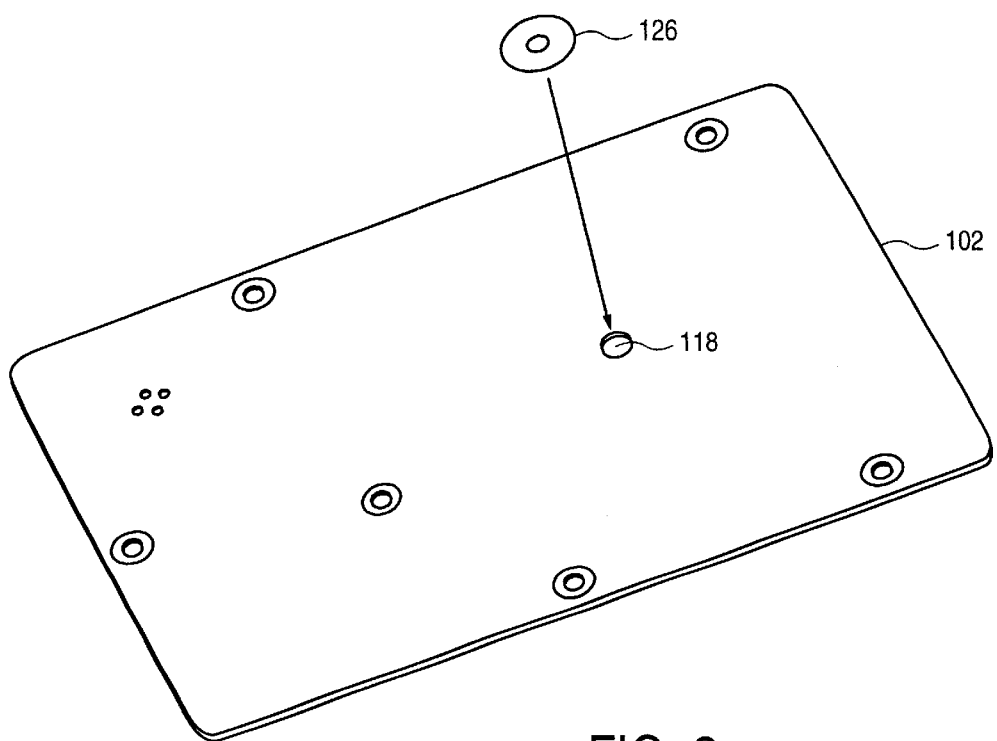
FIG. 2 shows a cover for a head disk assembly of a prior art disk drive, comprising a washer adhered to the cover using a visco damping adhesive for damping vibration frequencies characteristic of the fixed spindle shaft.
Figure 4:
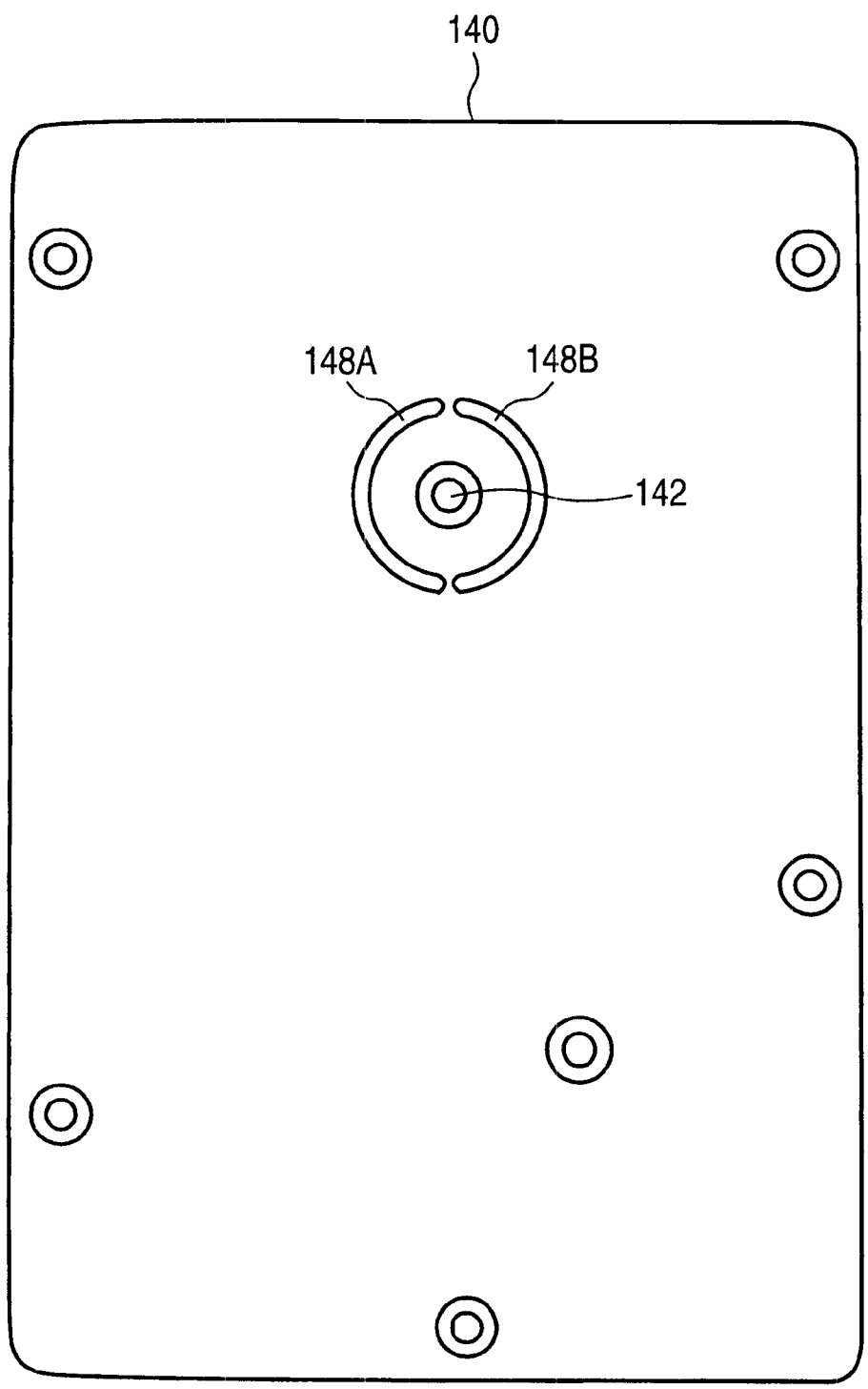
FIG. 4 shows a cover according to an embodiment of the present invention, wherein the slots comprise two arcs proximate the shaft aperture, and substantially concentric with the shaft aperture.

FIG. 4 shows a cover according to an embodiment of the present invention comprising two slots 148A and 148B, where the slots 148A and 148B comprise arcs that are substantially concentric with the shaft aperture 142. In one embodiment, the slots 148A and 148B comprise a plurality of apertures which pass completely through the cover 140. In another embodiment, the slots 148A and 148B comprise a plurality of grooves which do not pass completely through the cover 140. In either case, the slots 148A and 148B reduce the stiffness of the cover 140. The fixed spindle shaft 132 and cover 140 comprise a mechanical system that naturally resonates at a certain set of frequencies. Introducing extra flexibility into the cover 140 shifts these resonant frequencies to lower values, thereby reducing the probability of these frequencies lining up with the characteristic frequencies of the spindle motor bearings. To further reduce the probability of vibration frequencies lining up to produce resonances, a washer may be interposed at shaft aperture 142 between the fixed spindle shaft 132 and cover 140 similar to the prior art disk drive of FIG. 1 and FIG. 2.

Figure 5:
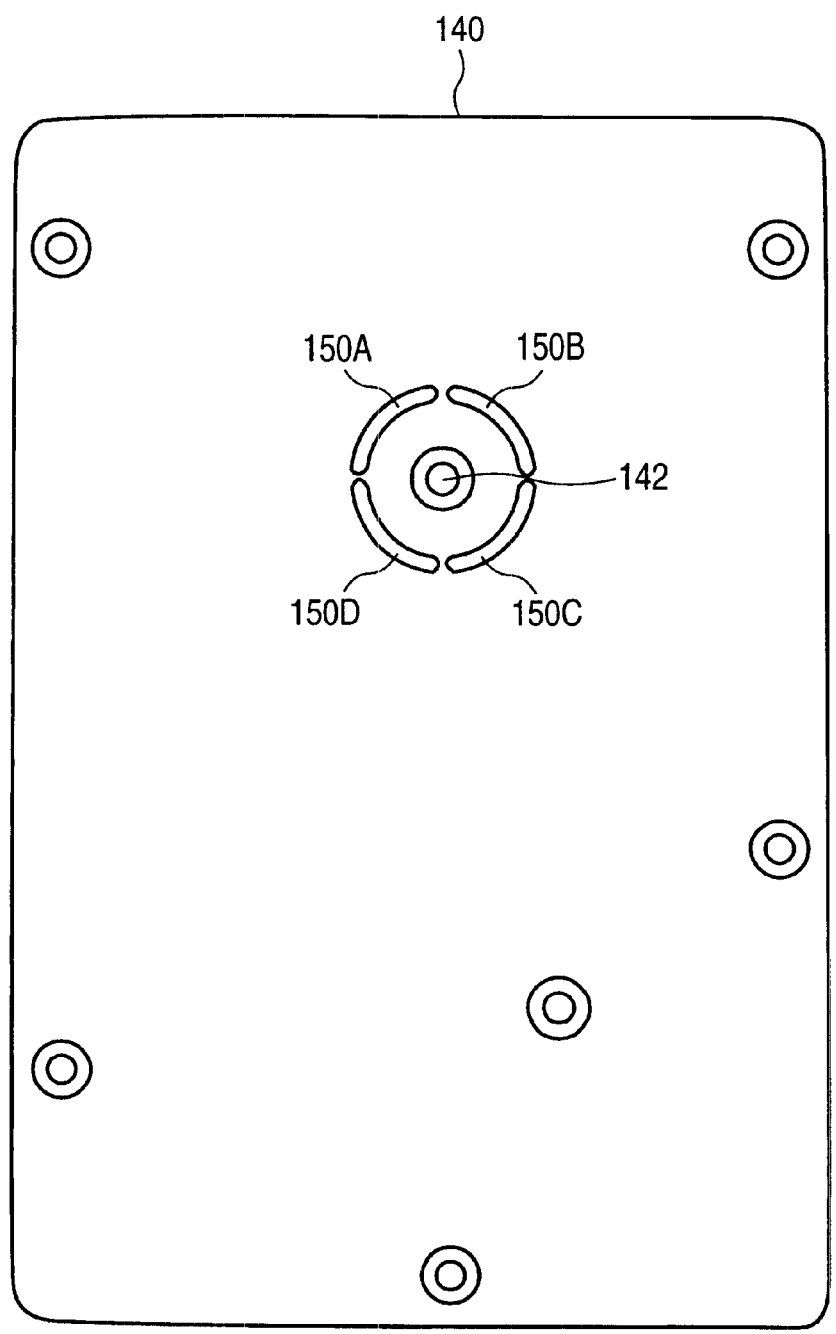
FIG. 5 shows a cover according to another embodiment of the present invention comprising a shaft aperture, and four slots comprising arcs proximate the shaft aperture.

FIG. 5 shows a cover 140 according to another embodiment of the present invention comprising four slots 150A–150D proximate the shaft aperture 142. The slots 150A–150D comprise arcs that are substantially concentric with shaft aperture 142. Similar to the embodiment of FIG. 4, the slots 150A–150D may comprise apertures which pass completely through the cover 140, or grooves which do not pass completely through cover 140.

Figure 6:
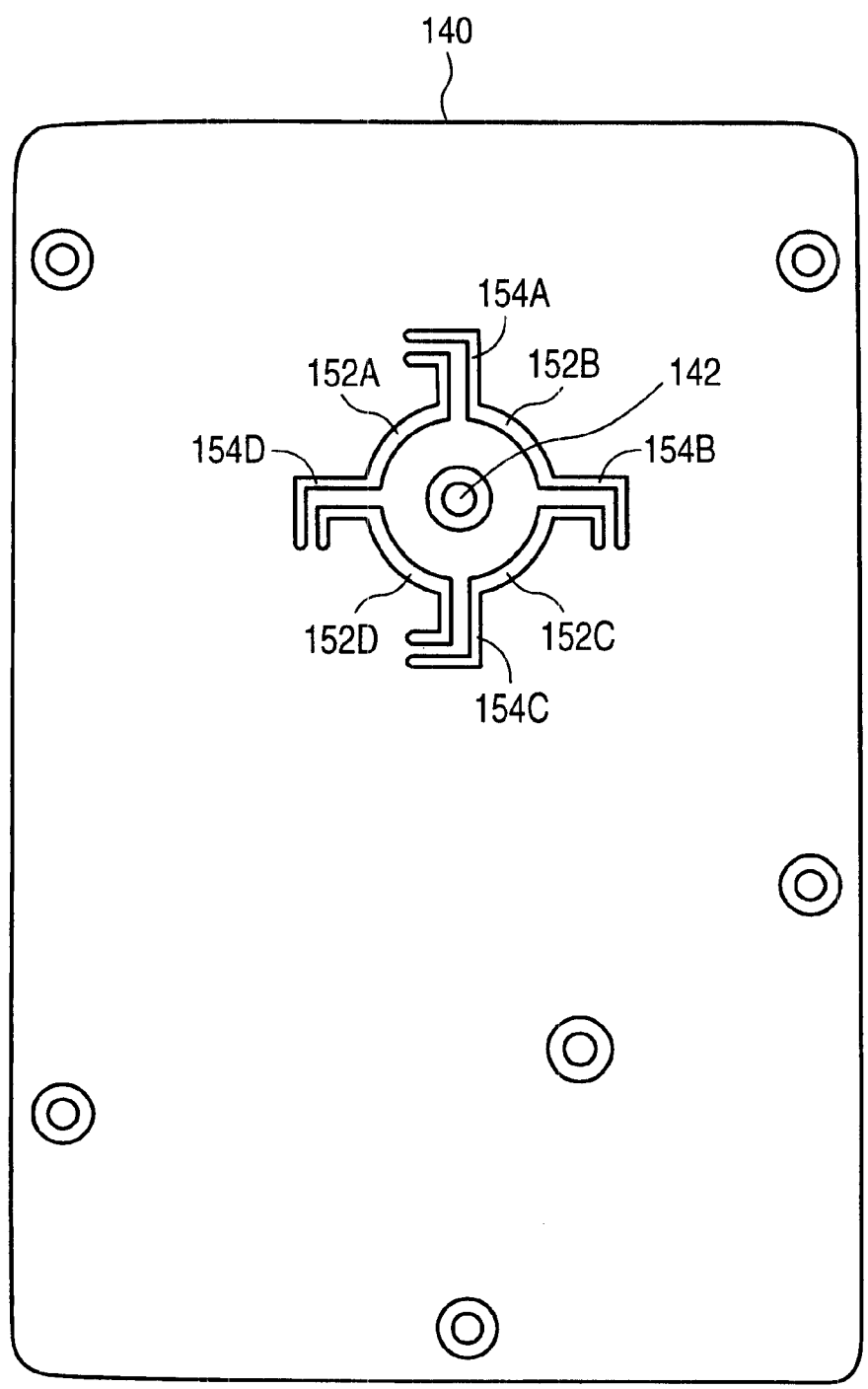
FIG. 6 shows a cover according to another embodiment of the present invention comprising a shaft aperture, and slots comprising spokes extending substantially radially from the shaft aperture and arcs substantially concentric with the shaft aperture.

FIG. 6 shows a cover 140 according to another embodiment of the present invention comprising four slots proximate shaft aperture 142. The slots comprise arcs 152A–152D that are substantially concentric with shaft aperture 142, and spokes 154A–154D that extend substantially radially from shaft aperture 142 and then at right angles. The arcs 152A–152D need not be circular arcs, and may have radii of curvature that are different from a center of the shaft aperture 142. The slots may comprise apertures which pass completely through the cover 140, or grooves which do not pass completely through the cover 140.

Figure 7:
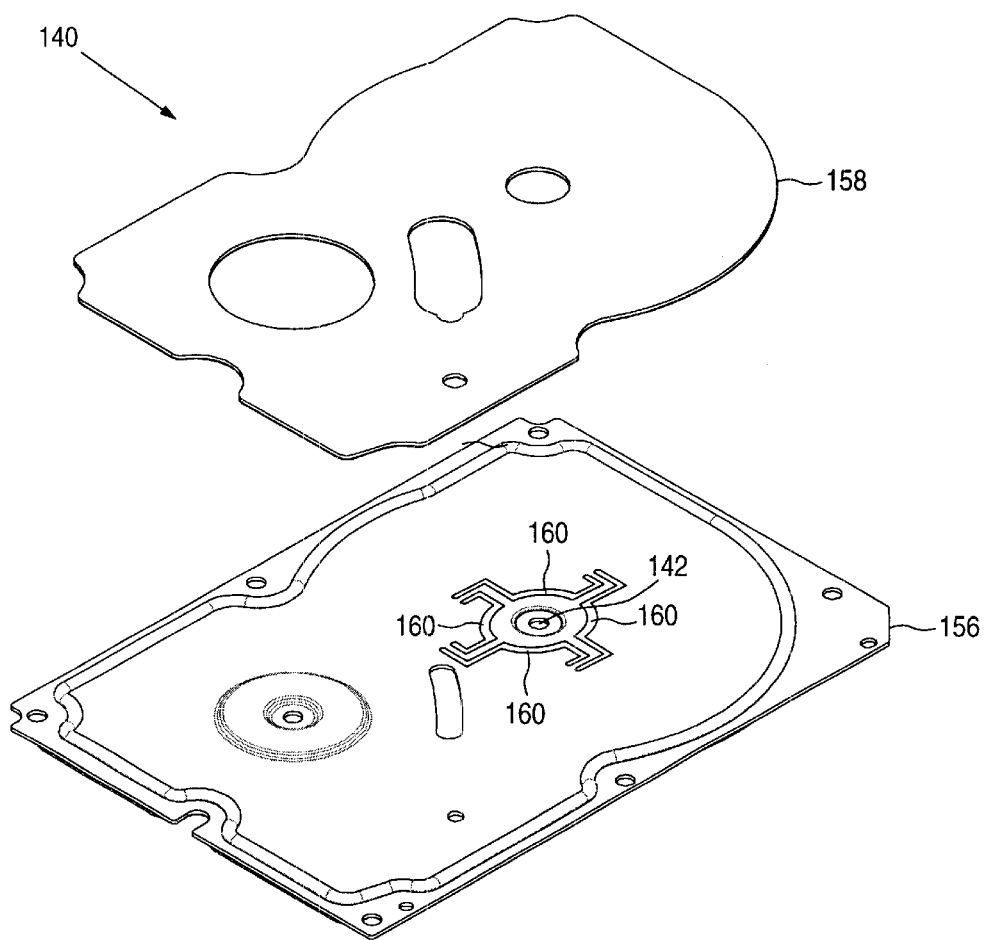
FIG. 7 shows a cover according to another embodiment of the present invention comprising an inner layer and an outer layer, wherein the inner layer comprises a shaft aperture and slots comprising spokes extending substantially radially from the shaft aperture and arcs substantially concentric with the shaft aperture.

FIG. 7 shows a cover 140 according to another embodiment of the present invention comprising an inner layer 156 attached to an outer layer 158 using a visco damping adhesive. The inner layer 156 comprises a shaft aperture 142 positioned over the fixed spindle shaft 132, and slots 160 proximate the shaft aperture 142. In one embodiment, the slots 160 comprise a plurality of apertures which pass completely through inner layer 156. In this embodiment, a label (e.g., a mylar label) is preferably attached to the inner side of the inner layer 156 to protect against contamination from the visco damping adhesive used to attach the outer layer 158 to the inner layer 156. In another embodiment, the slots 160 comprise a plurality of grooves which do not pass completely through inner layer 156. This embodiment does not require attaching a label to the inner side of the inner layer 156 since contamination is not a concern.

We claim:

1. A disk drive with reduced resonance, comprising:
   (a) a disk;
   (b) a fixed spindle shaft disposed axially through the disk;
   (c) a spindle motor for rotating the disk about the fixed spindle shaft, wherein a resonance is associated with the spindle motor rotating the disk;
   (d) a head;
   (e) an actuator arm for actuating the head radially over the disk;
   (f) a base; and
   (g) a cover attached to the base to form a head disk assembly chamber, the cover comprising:
      a shaft aperture positioned over the fixed spindle shaft, the shaft aperture for receiving a fastener for attaching the cover to the fixed spindle shaft; and
      a plurality of slots proximate the shaft aperture, wherein the shaft aperture and slots provide a flexible support for the fixed spindle shaft which reduces the resonance associated with the spindle motor,
   wherein:
      the cover comprises an inner layer and a rigid outer layer; and
      the inner layer comprises the slots.

2. The disk drive as recited in claim 1, wherein the slots comprise a plurality of slot apertures.

3. The disk drive as recited in claim 1, wherein the slots comprise a plurality of grooves.

4. The disk drive as recited in claim 1, wherein the slots comprise at least one spoke extending substantially radially from the shaft aperture.

5. The disk drive as recited in claim 1, wherein the slots comprise at least one arc substantially concentric with the shaft aperture.

6. A disk drive with reduced resonance, comprising:
(a) a disk;
(b) a fixed spindle shaft disposed axially through the disk;
(c) a spindle motor for rotating the disk about the fixed spindle shaft, wherein a resonance is associated with the spindle motor rotating the disk;
(d) a head;
(e) an actuator arm for actuating the head radially over the disk;
(f) a base; and
(g) a cover attached to the base to form a head disk assembly chamber, the cover comprising:
   a shaft aperture positioned over the fixed spindle shaft, the shaft aperture for receiving a fastener for attaching the cover to the fixed spindle shaft; and
   a plurality of slots proximate the shaft aperture, wherein the shaft aperture and slots provide a flexible support for the fixed spindle shaft which reduces the resonance associated with the spindle motor, wherein the slots comprise:
      at least one spoke extending substantially radially from the shaft aperture; and
      at least one arc substantially concentric with the shaft aperture.

7. The disk drive as recited in claim 6, wherein the slots comprise a plurality of slot apertures.

8. The disk drive as recited in claim 6, wherein the slots comprise a plurality of grooves.

9. A method for manufacturing a disk drive with reduced resonance, comprising the steps of:
(a) forming a shaft aperture in a cover comprising an inner layer and a rigid outer layer;
(b) forming a plurality of slots in the inner layer proximate the shaft aperture;
(c) disposing a head disk assembly into a base of a head disk assembly chamber, the head disk assembly comprising a disk, a fixed spindle shaft, and a motor for rotating the disk about the fixed spindle shaft; and
(d) attaching the cover to the base of the head disk assembly chamber comprising the step of attaching a fastener to the fixed spindle shaft through the shaft aperture,
   wherein a resonance associated with the spindle motor rotating the disk is reduced due to a flexibility provided by the slots.

10. A method for manufacturing a disk drive with reduced resonance, comprising the steps of:
(a) forming a shaft aperture in a cover;
(b) forming a plurality of slots in the cover proximate the shaft aperture, the slots comprising at least one spoke extending substantially radially from the shaft aperture and at least one arc substantially concentric with the shaft aperture;
(c) disposing a head disk assembly into a base of a head disk assembly chamber, the head disk assembly comprising a disk, a fixed spindle shaft, and a motor for rotating the disk about the fixed spindle shaft; and
(d) attaching the cover to the base of the head disk assembly chamber comprising the step of attaching a fastener to the fixed spindle shaft through the shaft aperture,
   wherein a resonance associated with the spindle motor rotating the disk is reduced due to a flexibility provided by the slots.

* * * * *